United States Patent [19]
Miller et al.

[11] Patent Number: 5,774,490
[45] Date of Patent: Jun. 30, 1998

[54] DIODE-PUMPED TM: YAG/HBR FOUR MICRON LASER SYSTEM

[75] Inventors: Harold C. Miller, Albuquerque, N. Mex.; Dan Radzykewycz, Nashville, Tenn.; Gordon Hager, Rio Rancho, N. Mex.

[73] Assignee: The United States of America as represented by the Secretary of the Air Force, Washington, D.C.

[21] Appl. No.: 734,617

[22] Filed: Oct. 7, 1996

[51] Int. Cl.$^6$ .................................................. H01S 3/095
[52] U.S. Cl. ............................... 372/89; 372/70; 372/97; 372/20
[58] Field of Search ................................ 372/89, 41, 70, 372/97, 20, 69

[56] References Cited

U.S. PATENT DOCUMENTS

| | | |
|---|---|---|
| 3,164,545 | 1/1965 | Mattox . |
| 3,440,164 | 4/1969 | Aldridge . |
| 3,449,242 | 6/1969 | Mattox et al. . |
| 3,810,042 | 5/1974 | Chang et al. ........................ 331/94.5 |
| 3,860,884 | 1/1975 | Chang et al. ...................... 331/94.5 G |
| 4,003,823 | 1/1977 | Baird, Jr. et al. . |
| 4,007,109 | 2/1977 | Baird, Jr. et al. . |
| 4,127,470 | 11/1978 | Baird, Jr. et al. . |
| 4,145,668 | 3/1979 | Mastrup et al. ..................... 331/94.5 P |
| 4,163,043 | 7/1979 | Dezael et al. . |
| 4,217,557 | 8/1980 | Foster et al. ....................... 331/94.5 G |
| 4,310,049 | 1/1982 | Kalvinskas et al. . |
| 4,357,309 | 11/1982 | Arnold et al. ........................... 423/486 |
| 4,437,980 | 3/1984 | Heredy et al. . |
| 4,517,676 | 5/1985 | Meinzer et al. ......................... 372/89 |
| 4,566,965 | 1/1986 | Olmstead . |
| 4,598,409 | 7/1986 | Injeyan et al. ........................... 372/89 |

OTHER PUBLICATIONS

LaCount et al., "Oxidation of Dibenzothiophene and Reaction of Dibenzothiophene 5,5–Dioxide with Aqueous Alkali," *Journal of Organic Chemistry*, 42(16), 1977.

Burger et al., "Symposium on Progress in Processing Synthetic Crudes and Resids," ACS (Aug. 24–29, 1975).

Yamaguchi et al., "Desulfurization of Heavy Oil and Preparation of Activated Carbon by Means of Coking Procedure," Chibakogyodaiku Kenkyui Hokoku No. 21, p. 115 (Jan. 30, 1976).

*Primary Examiner*—Leon Scott, Jr.
*Attorney, Agent, or Firm*—Robert L. Nathans

[57] ABSTRACT

An HBr laser is pumped by a slave laser power oscillator which excites the (2,0) absorption band of the HBr laser, to cause it to lase around four microns. A tunable master oscillator, which is frequency locked to an HBr reference cell, seeds the slave oscillator and maintains lock-on to an absorption line in the (2,0) band of HBr.

18 Claims, 1 Drawing Sheet

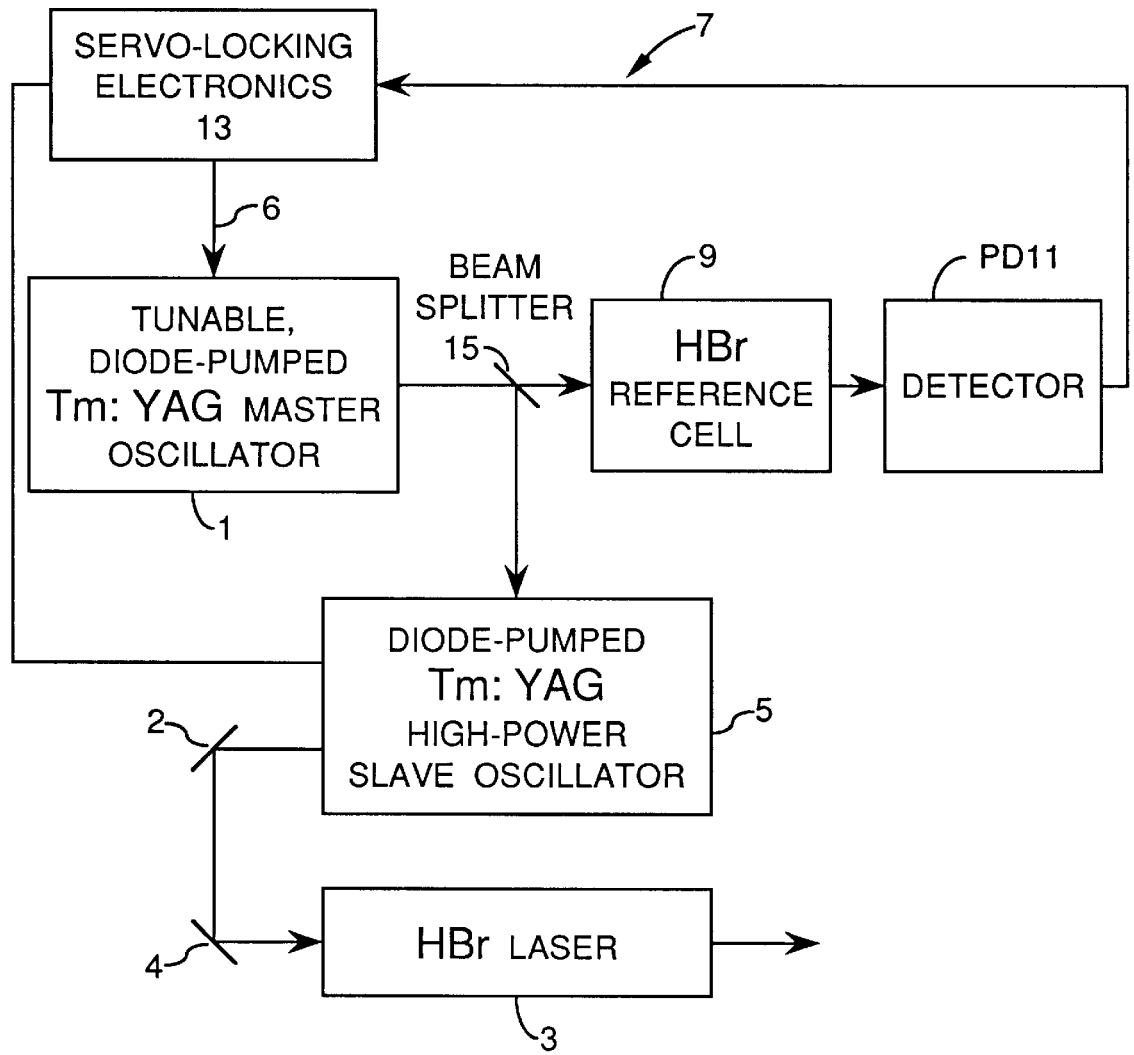

5,774,490

DIODE-PUMPED TM: YAG/HBR FOUR MICRON LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of high power infra-red lasers.

The development of coherent mid-infrared light beam generators is being pursued by numerous organizations using various laser media. The Naval Research Laboratory has down-converted radiation in an optical parametric oscillator to create light beams having a wavelength of four microns. However, the scalability of this method is limited by crystal damage. Gas-phase lasers have been proven to be ideally suited for desired high average power applications, because thermal issues can be addressed using heat exchangers or by flowing the lasant gas.

It is thus desirable to provide high power systems employing gas-phase lasers. Such systems, which can advantageously utilize master/slave diode pumped YAG lasers, should also have a high overall efficiency. It is also desirable to provide such a system which can be highly compact.

BRIEF SUMMARY OF THE INVENTION

In accordance with the aforesaid goals and with a preferred embodiment of the invention, a high power optically pumped hydrogen bromide gas laser produces laser radiation in the desirable atmospherically transmissive window near four microns by being driven by a high power diode-pumped Tm:YAG slave laser oscillator, which in turn is seeded by a similar diode-pumped Tm:YAG master laser oscillator. The tunable master laser oscillator produces two micron output light over a range of several nanometers overlapping several lines in the (2,0) absorption band of the HBr laser. The tunable master oscillator is made to lock on to a spectral line in the absorption band by passing some output light from the master oscillator through an HBr reference cell and photodetector unit which produces an electrical error signal fed back to a servo circuit to maintain lock-on. This pumping process results in a population inversion on lines in the (2,1) band of HBr. Lasing in the four micron region is produced by stimulated emission in one or more of these lines.

BRIEF DESCRIPTION OF THE DRAWINGS

Other features and advantages of the invention will become apparent upon reading of the following description, taken in conjunction with the sole figure, schematically illustrating a preferred embodiment of the invention.

DETAILED DESCRIPTION OF A PREFERRED EMBODIMENT OF THE INVENTION

Referring now to the sole figure, a tunable diode-pumped Tm:YAG master oscillator 1 is coupled to a diode-pumped Tm:YAG high power slave oscillator 5 via beamsplitter 15. Part of the output beam from master oscillator 1 passes through an HBr reference cell 9 which is sensed by photodetector 4. The detector output is sent into a conventional servo-locking electronics device 13 which provides an error signal applied to master oscillator 1 via lead 6. The error signal is used to keep the frequency of the master oscillator tuned or locked-on to an HBr (2,0) absorption line. That part of the output beam from master oscillator 1 not sent to the reference cell 9 seeds the diode pumped high power slave oscillator 5. By seeding the slave oscillator, the high power output of the slave oscillator is locked to the same (2,0) absorption line to which the master oscillator is locked by the feedback loop 7, comprising the HBr reference cell 9, the photodetector 11 and the servo-locking unit 13. Thus, the output of the slave oscillator 5 is used to pump the Hbr laser 3, via mirrors 2 and 4, which lases around four microns, to provide a powerful laser system output in the four micron atmospherically transmissive window.

The master laser oscillator lases around 2.01–2.02 microns, and both lasers 1 and 5 are preferrably diode-pumped. Conventional GaAlAs diode arrays operating near 785 nanometers may be used to pump the lasers. The resulting system is highly efficient and enables the use of a hydrogen bromide gas-phase laser suitable for high average power applications.

While preferred embodiments have been described, other embodiments will become apparent to the skilled worker in the art, and thus the scope of the invention is to be restricted solely to the terms of the following claims and art recognized equivalents thereof

What is claimed is:

1. Laser system capable of producing laser radiation in an atmospherically transmissive window near four microns comprising:
   (a) a master laser oscillator for producing output light over a range of several nanometers overlapping several lines in the (2,0) absorption band of hydrogen bromide;
   (b) a hydrogen bromide laser; and
   (c) a slave laser power oscillator seeded by said master oscillator and optically coupled between said master laser oscillator and said hydrogen bromide laser for exciting the (2,0) band of said hydrogen bromide laser by pumping, thereby to cause the hydrogen bromide laser to lase around four microns.

2. The system of claim 1 including tuning means for enabling said master laser oscillator to lock on to a spectral line in said (2,0) absorption band of hydrogen bromide.

3. The system of claim 2 wherein said tuning means includes a hydrogen bromide reference cell for producing a feedback signal applied to said master laser oscillator to maintain said lock-on in response to receipt of output light applied to said reference cell from said master laser oscillator.

4. The system of claim 3 wherein said master laser oscillator lases around two microns.

5. The system of claim 4 wherein said master laser oscillator comprises a Tm:YAG laser, and a diode laser means operating at about 785 nanometers for pumping said Tm:YAG laser.

6. The system of claim 2 wherein said master laser oscillator lases around two microns.

7. The system of claim 6 wherein said master laser oscillator comprises a Tm:YAG laser, and a diode laser means operating at about 785 nanometers for pumping said Tm:YAG laser.

8. The system of claim 1 wherein said master laser oscillator lases around two microns.

9. The system of claim 8 wherein said master laser oscillator comprises a Tm:YAG laser, and a diode laser means operating at about 785 nanometers for pumping said Tm:YAG laser.

10. Laser system capable of producing laser radiation in an atmospherically transmissive window near four microns comprising:

(a) a tunable optically-pumped master laser oscillator for producing output light over a range of several nanometers overlapping several lines in the (2,0) absorption band of hydrogen bromide and centered at a wavelength of 2.01 microns;

(b) a hydrogen bromide laser; and (c) an optically-pumped slave laser power oscillator seeded by said master oscillator and optically coupled between said master laser oscillator and said hydrogen bromide laser for exciting the (2,0) band of the hydrogen bromide laser by pumping, thereby to cause the hydrogen bromide laser to lase around four microns.

11. The system of claim 10 including tuning means for enabling said master laser oscillator to lock on to a spectral line in said (2,0) absorption band of hydrogen bromide.

12. The system of claim 11 wherein said tuning means includes a hydrogen bromide reference cell for producing a feedback signal applied to said master laser oscillator to maintain said lock-on in response to receipt of output light by said reference cell from said master laser oscillator.

13. The system of claim 12 wherein said master laser oscillator comprises a Tm:YAG laser, and a diode laser means operating at about 785 nanometers for pumping said Tm:YAG laser.

14. The system of claim 11 wherein said master laser oscillator comprises a Tm:YAG laser, and a diode laser means operating at about 785 nanometers for pumping said Tm:YAG laser.

15. The system of claim 10 wherein said master laser oscillator comprises a Tm:YAG laser, and a diode laser means operating at about 785 nanometers for pumping said Tm:YAG laser.

16. Laser system capable of producing laser radiation in an atmospherically transmissive window near four microns comprising:

(a) a hydrogen bromide laser for producing output light having a wavelength in the four micron region;

(b) a laser means for producing output light over a range of several nanometers overlapping several lines in the (2,0) absorption band of hydrogen bromide and centered at a wavelength of about 2.01 microns; and (c) means for exciting said hydrogen bromide laser by applying the output light of the laser means of (b) to said hydrogen bromide laser.

17. The laser system of claim 16 wherein the laser means of (b) comprises a Tm:YAG laser.

18. The laser system of claim 17 wherein said Tm:YAG laser is pumped by an LED emitting light in the wavelength of 0.785 microns.

* * * * *